United States Patent
Lee et al.

(10) Patent No.: US 8,632,926 B2
(45) Date of Patent: Jan. 21, 2014

(54) SOLID PROTON CONDUCTOR INCLUDING ACID TREATED OXIDE NANOPARTICLES AND FUEL CELL INCLUDING THE SAME

(75) Inventors: Myung-jin Lee, Yongin-si (KR); Moon-sung Kang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 719 days.

(21) Appl. No.: 12/169,156

(22) Filed: Jul. 8, 2008

(65) Prior Publication Data
US 2009/0169956 A1 Jul. 2, 2009

(30) Foreign Application Priority Data

Dec. 31, 2007 (KR) .................. 10-2007-0141655

(51) Int. Cl.
*H01M 8/10* (2006.01)
(52) U.S. Cl.
USPC ........... 429/494; 429/491; 429/492; 429/493; 429/495
(58) Field of Classification Search
USPC .................. 429/33, 491, 492, 493, 494, 495
See application file for complete search history.

(56) References Cited

U.S. PATENT DOCUMENTS

| 2003/0087972 A1* | 5/2003 | Taniguchi et al. .............. 521/27 |
| 2003/0148162 A1 | 8/2003 | Narayanan et al. ............. 429/33 |
| 2006/0159974 A1 | 7/2006 | Li et al. ........................... 429/33 |
| 2006/0182942 A1* | 8/2006 | Valle et al. ................. 428/304.4 |
| 2008/0008918 A1* | 1/2008 | Kim ................................ 429/30 |
| 2008/0085441 A1* | 4/2008 | Lee et al. ........................ 429/33 |

FOREIGN PATENT DOCUMENTS

| JP | 2004-139858 A | 5/2004 |
| JP | 2004-185891 A | 7/2004 |
| JP | 2005-174911 A | 6/2005 |
| JP | 2005-516345 A | 6/2005 |
| JP | 2006-260797 A | 9/2006 |
| KR | 10-2002-0086811 A | 11/2002 |
| KR | 10-2005-0008133 A | 1/2005 |
| KR | 10-2006-0023674 A | 3/2006 |
| KR | 10-2006-0050744 A | 5/2006 |
| WO | WO 2007048612 A2 * | 5/2007 |

OTHER PUBLICATIONS

Adjemian et al., Function and Characterization of Metal Oxide-Nafion Composite Membranes for Elevated-Temperature H2/O2 PEM Fuel Cells, Mar. 30, 2006, 18, 2238-2248.*
Lee et al., Sulfonated poly(arylene ether sulfone)-silica nanocomposite membrane for direct methanol fuel cell (DMFC), Jul. 22, 2007, 303, 258-266.*
Matos et al., Nafion-Titanate Nanotube Composite Membranes for PEMFC Operating at High Temperature, Oct. 18, 2007, 154, B1358-B1361.*
Kim, Je-Deok et al. "Anhydrous Proton-Conducting Properties of Nafion-1, 2, 4-Triazole and Nafion—Benzimidazole Membranes for Polymer Electrolyte Fuel Cells", Journal of the Electrochemical Society, 2007, 154(4), pp. A290-A294.

(Continued)

*Primary Examiner* — Basia Ridley
*Assistant Examiner* — Sean P Cullen
(74) *Attorney, Agent, or Firm* — Stein IP, LLC (57) ABSTRACT

Provided are a solid proton conductor and a fuel cell including the solid proton conductor. The solid proton conductor includes a polymer providing a proton source, and a polymer solvent providing a proton path.

16 Claims, 5 Drawing Sheets

(56) References Cited

OTHER PUBLICATIONS

K.D. Kreuer, "New Proton Conducting Polymers For Fuel Cell Applications", Solid State Ionics: Science & Technology, pp. 263-274, 1998.

K.D. Kreuer et al., "Imidazole and pyrazole-based proton conducting polymers and liquids" (Received Oct. 27, 1996; accepted Mar. 21, 1997), Electrochimica Acta, vol. 43, Nos. 10-11, pp. 1281-1288 (1998).

Q. Li, et al. "PBI-Based Polymer Membranes for High Temperature Fuel Cells-Preparation, Characterization and Fuel Cell Demonstration", Fuel Cells 2004, vol. 4, No. 3, pp. 147-159.

Je-Deok Kim, et al. "Anhydrous Proton-Conducting Properties of Nafion-1, 2, 4-Trizole and Nafion-Benzimidazole Membranes for Polymer Electrolyte Fuel Cells" (Manuscript submitted Sep. 28, 2006; revised manuscript received Nov. 13, 2006. Available electronically Feb. 9, 2007), Journal of The Electrochemical Society, vol. 154, No. 4, pp. A290-A294 (2007).

\* cited by examiner

SOLID PROTON CONDUCTOR INCLUDING ACID TREATED OXIDE NANOPARTICLES AND FUEL CELL INCLUDING THE SAME

CROSS-REFERENCE TO RELATED APPLICATION

This application claims the benefit of Korean Application No. 2007-141655, filed Dec. 31, 2007 in the Korean Intellectual Property Office, the disclosure of which is incorporated herein by reference.

BACKGROUND OF THE INVENTION

1. Field of the Invention

Aspects of the present invention relate to a solid proton conductor and a fuel cell including the solid proton conductor.

2. Description of the Related Art

An improved hydrogen conductive material for transmitting protons at high temperature under non- or low-humidified conditions is desirable for polymer electrolyte membrane fuel cells (PEMFCs).

A high-temperature electrolyte membrane can be prepared by removing a water component from an existing acid electrolyte membrane or using a hydrogen solvent having a high boiling point. It has been reported that when a fuel cell is fabricated using an phosphoric acid added to polybenzimidazole, the operational temperature of the fuel cell can increase up to about 200° C.

However, in this case, catalyst poisoning may be caused by the phosphoric acid, and the phosphoric acid can be washed out due to byproduct water when the PEMFC operates for a long time at a temperature of 100° C. or lower.

Heterocyclic compounds such as imidazoles, pyrazoles, and benzimidazoles have been developed as proton conductors capable of operating in a temperature range from about 150° C. to about 250° C. as a replacement for water (Journal of The Electrochemical Society, 2007, 154(4) 290-294).

It is known that such heterocyclic compounds have both amphoteric and autoprotolysis characteristics and can form a hydrogen bond network, thereby having hydrogen (proton) conductivity higher than that of water.

However, the heterocyclic compounds are volatile due to their relatively low molecular weight and flash point. Therefore, when a heterocyclic compound is used in a high-temperature fuel cell, it is necessary to maintain fluidity and mobility of hydrogen ions by directly fixing the heterocyclic compound to a polymer electrolyte membrane. Moreover, many additional synthesis processes are required to use the heterocyclic compound in a high-temperature fuel cell, and the yields of these processes are low.

SUMMARY OF THE INVENTION

Aspects of the present invention provide a solid proton conductor for use in a fuel cell and having good proton conductivity in non-humidified conditions, a fuel cell electrolyte membrane including the solid proton conductor, and a fuel cell including the solid proton conductor or the electrolyte membrane.

According to an embodiment of the present invention, there is provided a solid proton conductor comprising: a polymer providing a proton source; and a polymer solvent providing a proton path.

According to another embodiment of the present invention, there is provided an electrolyte membrane for a fuel cell, comprising the solid proton conductor.

According to another embodiment of the present invention, there is provided a fuel cell comprising a cathode, an anode, and the solid proton conductor interposed between the cathode and the anode.

At least one of the cathode and the anode may comprise a polymer providing a proton source and a polymer solvent providing a proton path. In addition, at least one of the cathode and the anode may further comprise at least one additive selected from the group consisting of acid-treated oxide nanoparticles and acid-treated oxide nanorods.

According to another embodiment of the present invention, there is provided a fuel cell comprising the cathode and anode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide a solid proton conductor including a polymer providing a proton source, and a polymer solvent providing a proton path.

The polymer is an acidic polymer including an acidic group such as a phosphoric acid group and a sulfuric acid group.

The polymer may be a polymer containing a perfluorinated sulfonic acid group (such as, for example, NAFION, manufactured by Dupont), a sulfonated polyether ether ketone, polyimide, polystyrene or polysulfone or a sulfonated or phosphated hydrocarbon polymer.

The polymer solvent is a low-molecular-weight, hydrophilic, and solid polymer having non-paired electrons. The polymer solvent provides a proton path for the acidic group of the acidic polymer so as to ensure proton conductivity. For example, the polymer solvent may be polyethylene oxide, polyethylene glycol, poly2-ethyloxazoline, or a mixture thereof.

While not restricted thereto, the polymer solvent may have a weight average molecular weight in a range from about 1,000 to about 1,000,000. For example, the weight average molecular weight of the polymer solvent may range from about 3,000 to about 5,000. In another example, the weight average molecular weight of the polymer solvent may be 4600 g/mol.

The polymer providing a proton source may have a weight average molecular weight in a range from about 100,000 to about 1,000,000. For example, the weight average molecular weight of the polymer may range from about 200,000 to about 500,000.

A molar ratio of the polymer and the polymer solvent may be in a range from about 3:1 to about 1:10. For example, the molar ratio of the polymer and the polymer solvent may be in a range from about 1:3 to about 1:10. In another example, the molar ratio of the polymer and the polymer solvent may be 1:8.

The molar ratio of the polymer and the polymer solvent is calculated as follows. Molecular weights of repeating units of the polymer and the polymer solvent are respectively calculated to determine the number of moles of the polymer and the number of moles of the polymer solvent. Then, the molar ratio is calculated from the ratio of the mole numbers.

The solid proton conductor according to aspects of the present invention can further include at least one additive selected from the group consisting of acid-treated oxide nanoparticles and acid-treated oxide nanorods. The additive increases the mechanical strength and conductivity of the solid proton conductor.

The oxide nanoparticles or nanorods may be formed of at least one of titania ($TiO_2$), silica ($SiO_2$), and tin oxide ($SnO_2$).

As a specific, non-limiting example, the additive may include at least one material selected from the group consisting of acid treated titania ($TiO_2$) nanoparticles, acid treated titania ($TiO_2$) nanorods, acid treated silica ($SiO_2$) nanoparticles, and acid treated silica ($SiO_2$) nanorods.

The solid proton conductor may include 1 to 30 parts by weight of the additive based on 100 parts by weight of the total weight of the polymer and the polymer solvent. If the solid proton conductor includes less than 1 part by weight of the additive based on 100 parts by weight of the total weight of the polymer and the polymer solvent, the mechanical strength and conductivity of the solid proton conductor may not be sufficiently increased. If the solid proton conductor includes more than 30 parts by weight of the additive based on 100 parts by weight of the total weight of the polymer and the polymer solvent, the solubility of the solid proton conductor may be low, and thus it may be difficult to form a membrane using the solid proton conductor. However, the invention is not limited thereto, and other parts by weight may be used in appropriate circumstances.

Figure 1:
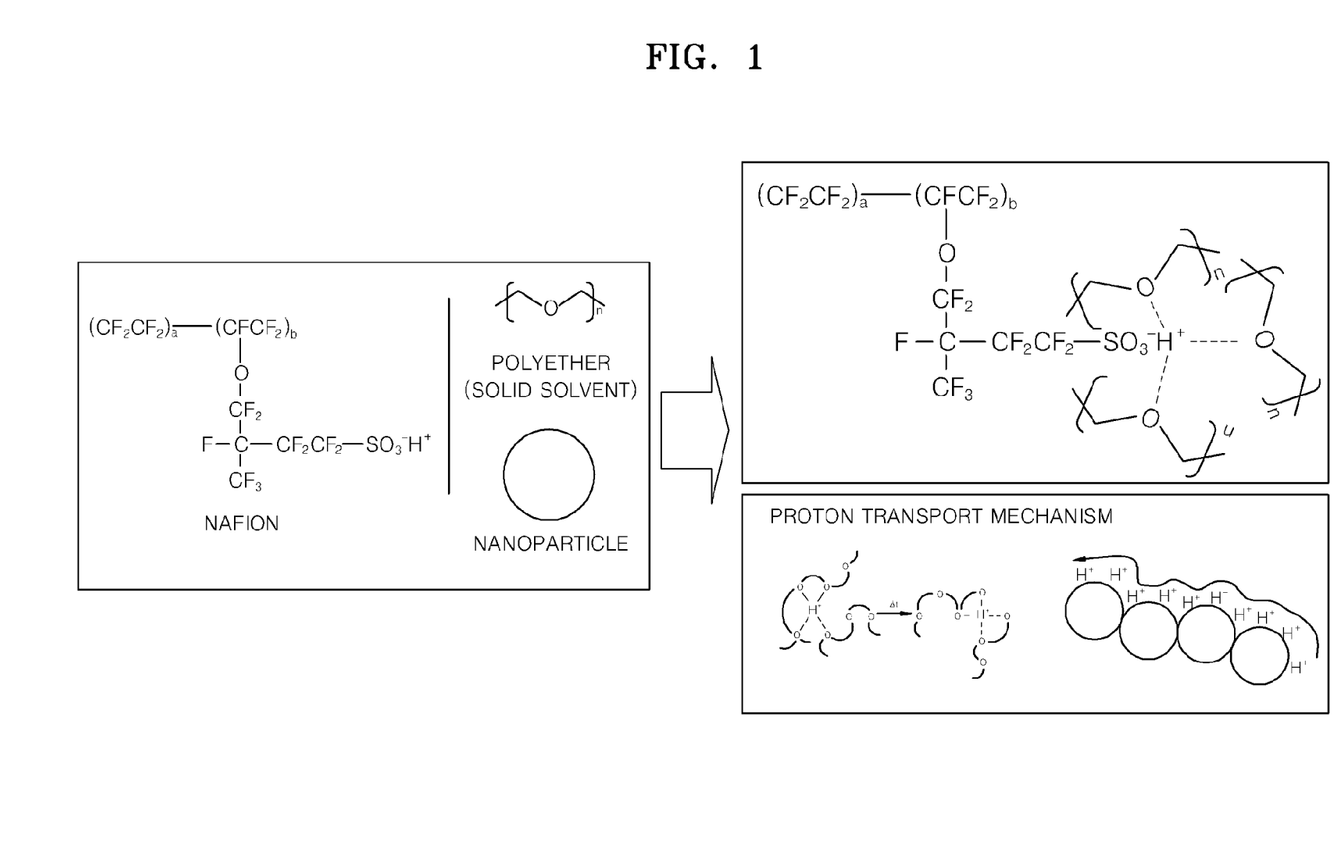
FIG. 1 is a diagram showing an operational mechanism of a proton conductor according to an embodiment of the present invention.

FIG. 1 is a diagram showing a proton transport mechanism of a proton conductor according to an embodiment of the present invention. In FIG. 1, the solid proton conductor includes NAFION (Dupont) as a polymer providing a proton source, a polyether based polymer as a polymer solvent providing a proton path, and titania ($TiO_2$) nanoparticles as an additive.

Referring to FIG. 1, a proton $H^+$ of a sulfonic group of the NAFION is optimally coupled to oxygen atoms of main chains of the polyether based polymer to form a complex. Then, the proton $H^+$ is transferred along the proton path provided by the polyether based polymer as a hydrophilic polymer. The nanoparticles make the transport path of the proton $H^+$ smoother. That is, the conduction of the proton $H^+$ is facilitated by the nanoparticles.

For example, two advantages can be obtained by using the nanoparticles. First, the nanoparticles improve the mechanical characteristics of a membrane formed by the solid proton conductor. Secondly, the nanoparticles convert the polymer solvent from a crystalline state to an amorphous state so that the polymer solvent can transmit more ions. In addition, the proton concentration in a membrane can be increased by adsorbing protons $H^+$ to surfaces of the nanoparticles. Moreover, proton paths can be formed along the surfaces of the nanoparticles.

The solid proton conductor according to aspects of the present invention is insoluble in water, and thus, it is easy to form a thin membrane using the solid proton conductor. Therefore, a polymer electrolyte membrane having good proton conductivity can be manufactured using the solid proton conductor, and the polymer electrolyte membrane can be efficiently used in a fuel cell. Particularly, a polymer electrolyte membrane having good proton conductivity can be manufactured without using a liquid medium such as water and phosphoric acid. The polymer solvent of the solid proton conductor is more advantageous than a monomolecular solvent, in that the polymer solvent is non-volatile and more suitable for maintaining the mechanical characteristics of an electrolyte membrane formed using the solid proton conductor.

The solid proton conductor according to aspects of the present invention can be applied to a surface of an electrode, or the solid proton conductor can be included in a composition used to form an electrode.

Since the solid proton conductor according to aspects of the present invention is solid, problems caused by a liquid medium such as water and phosphoric acid can be prevented. For example, reduction of the mechanical strength and durability of an electrolyte membrane caused by repetition of expansion and shrinking of an electrolyte membrane including the liquid medium can be prevented, and leakage of water generated by fuel cell reactions can be prevented. Furthermore, catalyst poisoning can be prevented. Moreover, since a humidification device is not necessary in a fuel cell system using the solid proton conductor, the fuel cell system can have a simple structure.

A method of fabricating an electrolyte membrane using a proton conductor will now be described in detail according to an embodiment of the present invention.

A polymer providing a proton source and a polymer solvent providing a proton path are mixed with a solvent, and the mixture is agitated. As non-limiting examples, the solvent can be acetonitrile, water, ethanol, or a mixture thereof. 500 to 1000 parts by weight of the solvent can be used based on 100 parts by weight of the polymer.

Then, the mixture is kept at room temperature (about 20 to 25° C.) to form an electrolyte membrane by solvent evaporation. Then, the electrolyte membrane is heat treated at a temperature of about 60° C. to about 120° C.

When the polymer and the polymer solvent are mixed with a solvent, at least one additive selected from the group consisting of acid treated oxide nanoparticles and acid treated oxide nanorods can be added to the mixture.

The acid treated oxide nanoparticles can be prepared by acid treating at least one material selected from the group consisting of titania ($TiO_2$) nanoparticles, silica ($SiO_2$) nanoparticles, and tin oxide ($SnO_2$) nanoparticles.

The acid treating can be performed as follows. Oxide nanoparticles are mixed with an acid solution such as a sulfuric acid, a phosphoric acid or acetic acid, and the mixture is agitated. Then, the mixture is centrifuged and washed repeatedly. Thereafter, the mixture is dried at a temperature of about 80° C. to 120° C. In this way, acid treated oxide nanoparticles can be prepared. The acid solution may be 10% to 30% by weight.

Acid treated oxide nanorods can be obtained by immersing the acid treated oxide nanoparticles into a strong alkaline solution and heat-treating the solution at a temperature of about 150° C. to about 180° C.

The electrolyte membrane of the current embodiment has good proton conductivity under non-humidified (non-aqueous) conditions.

A fuel cell can be fabricated by attaching a cathode and an anode to both sides of the electrolyte membrane according to an embodiment of the present invention.

At least one of the cathode and the anode can also include the polymer providing a proton source and the polymer solvent providing a proton path. Also, at least one of the cathode and the anode can further include at least one additive selected from the group consisting of acid treated oxide nanoparticles and acid treated oxide nanorods.

The fuel cell can be used in various fields. For example, the fuel cell can be used as a PEMFC in various fields, such as for powering consumer electronics, computers, vehicles, etc.

The solid proton conductor can be used in a fuel cell as described above. However, the solid proton conductor can be used in other cells too, such as a lithium cell and a photochemical solar cell.

A lithium cell including a solid proton conductor will now be described according to an embodiment of the present invention.

The solid proton conductor for a lithium cell includes an ion conductive polymer, a polymer solvent, and a lithium salt.

The ion conductive polymer may be the same as the polymer that is used in the fuel cell solid proton conductor for providing a proton source, except that the ion conductive polymer includes lithium ions instead of protons.

The polymer solvent can be the same as the polymer solvent that is used in the fuel cell solid proton conductor for providing a proton path. The lithium salt can be a lithium salt that is commonly used for a lithium cell. For example, the lithium salt can include at least one material selected from the group consisting of $LiClO_4$, $LiBF_4$, $LiPF_6$, $LiCF_3SO_3$, and $LiN(CF_3SO_2)_2$. The concentration of the lithium salt can vary within a generally-known range.

The molar ratio of the ion conductive polymer and the polymer solvent may be in a range from about 3:1 to about 1:10. About 0.1 to 10 parts by weight of the lithium salt are used based on 100 parts by weight of the total weight of the ion conductive polymer and the polymer solvent.

The lithium cell solid proton conductor has acceptable lithium ion conductivity at room temperature. The lithium cell can be safely used since the proton conductor is solid.

A solar cell including a solid proton conductor will now be described according to an embodiment of the present invention.

The solid proton conductor for a solar cell includes an ion conductive polymer having anion exchanging group, a polymer solvent, and an iodine ($I_2$)/iodide salt. The anion exchanging group of the ion conductive polymer includes a pyridinium group and a quaternary ammonium group —$NR_3^+$ (where R denotes hydrogen or an alkyl group C1-C10 such as methyl, ethyl, propyl, and pentyl).

The ion conductive polymer may be the same as the polymer that is used in the fuel cell solid proton conductor for providing a proton source, except that the ion conductive polymer includes an anion exchanging group such as a pyridinium group and quaternary ammonium group —$NR_3^+$ instead of a cation exchanging group. The polymer solvent can be the same as the polymer solvent that is used in the fuel cell solid proton conductor for providing a proton path.

$I^-$ and $I_3^-$ ions can be generated from the iodine ($I_2$)/iodide salt. $I^-$ and $I_3^-$ ions reversibly react with each other.

The iodide salt can be one selected from the group consisting of lithium iodide, sodium iodide, potassium iodide, magnesium iodide, copper iodide, silicon iodide, manganese iodide, barium iodide, molybdenum iodide, calcium iodide, iron iodide, cesium iodide, zinc iodide, mercury iodide, ammonium iodide, methyl iodide, methylene iodide, ethyl iodide, ethylene iodide, isopropyl iodide, isobutyl iodide, benzyl iodide, benzoyl iodide, allyl iodide, and imidazolium iodide. However, the iodide salt is not limited to the listed materials.

The iodide salt may be 150 to 3,000 parts by weight based on 100 parts by weight of iodine ($I_2$). When the iodide salt is less than 150 parts by weight, reactivity is lowered. On the other hand, when the iodide salt is greater than 3,000 parts by weight, the flow of electrons can be disturbed, and thus, a current cannot be obtained.

The molar ratio of the ion conductive polymer and the polymer solvent may be in the range from about 3:1 to about 1:10.

The solar cell solid proton conductor has good electron transporting capability at room temperature.

Aspects of the present invention will now be described in more detail according to embodiments. However, the present invention is not limited to these embodiments.

Embodiment I

Fabrication of an Electrolyte Membrane

Molecular weights of repeating units of NAFION and polyethylene glycol (PEG, Mw=4,600 g/mol) were calculated, and then electrolyte membranes were fabricated while varying the molar ratio of the NAFION and the PEG as shown in Table 1 so as to determine a proper blending ratio of the NAFION and the PEG. The molecular weight of the repeating unit (—$C_7HF_{13}O_5SC_2F_4$—) of the NAFION is 544 g/mol, and the molecular weight of the repeating unit (—$CH_2$—$CH_2$-0-) of the PEG is 44 g/mol. Table 1 shows the relative weights of NAFION and PEG when the molar ratio of the NAFION and the PEG is 3:1, 1:1, 1:3, 1:6, 1:8, and 1:10. In Table 1, the total weight of the NAFION and PEG is constant at 1 g.

TABLE 1

| NAFION:PEG molar ratio | Weight of NAFION (g) | Weight of PEG (g) |
|---|---|---|
| 3:1 | 0.974 | 0.026 |
| 1:1 | 0.925 | 0.075 |
| 1:3 | 0.805 | 0.195 |
| 1:6 | 0.673 | 0.327 |
| 1:8 | 0.607 | 0.393 |
| 1:10 | 0.553 | 0.447 |

1 g of the NAFION and PEG was dissolved in an acetonitrile/water/ethanol solvent (acetonitrile 9 g/water 1 g/ethanol 3 g), and then the solution was agitated more than 12 hours.

Since acetonitrile is a highly-volatile material, acetonitrile can be used as a good solvent for fabricating an electrolyte membrane. However, since the NAFION and PEG are not completely dissolved in acetonitrile, small amounts of water and alcohol (ethanol) are added to completely dissolve the NAFION and the PEG. When the NAFION and PEG were completely dissolved, the solution became transparent. Then, the solution was poured into a Petri dish to evaporate the solvent at room temperature. That is, an electrolyte membrane was formed by evaporating the solvent from the solution. The transparency of the electrolyte membrane varies according to the ratio of the NAFION and the PEG. That is, the electrolyte membrane may be very transparent when the NAFION content is high. On the other hand, the electrolyte membrane may be almost opaque when the PEG content is high.

Thereafter, the electrolyte membrane was put in an oven at about 130° C. for about 30 minutes.

All chemicals used for manufacturing the electrolyte membrane were products of Aldrich Company. All the chemicals except for NAFION were used without an additional purification process. Solid NAFION powder obtained from a dispersion by reprecipitation was also used.

Embodiment II

Fabrication of an Electrolyte Membrane

A solution containing NAFION and PEG (Mw=46,000 g/mol) (NAFION:PEG molar ratio=1:8) was prepared in the same way as in Embodiment 1, and titanium oxide nanoparticles (AMT 600, Tayca corp., Japan) doped with an acid were added to the solution.

The acid doped titanium oxide nanoparticles (NP) were prepared by agitating titanium oxide nanoparticles in 20% by weight of a phosphoric acid aqueous solution for more than 6 hours, repeatedly centrifuging and washing the agitated mixture, and keeping the mixture in a vacuum oven for more than a day.

1, 5, 10, 20, and 30 parts by weight of the titanium oxide nanoparticles were respectively added to the solution based on 100 parts by weight of the total weight of the NAFION and the PEG so as to prepare solutions having different concentrations of the titanium oxide nanoparticles. Thereafter, electrolyte membranes were fabricated using the solutions in the same way as in Embodiment I.

Embodiment III

Fabrication of an Electrolyte Membrane

In Embodiment III, an electrolyte membrane was fabricated in the same way as in Embodiment II except that 20% by weight of an aqueous solution of acetic acid and 20% by weight of an aqueous solution of sulfuric acid were respectively used instead of using 20% by weight of an aqueous solution of phosphoric acid to form the acid doped titanium oxide nanoparticles. 5 parts by weight of titanium oxide nanoparticles doped with an acid were used based on 100 parts by weight of the total weight of NAFION and PEG.

Embodiment IV

Fabrication of an Electrolyte Membrane

Titanium oxide nanoparticles (AMT600, Tayca corp., Japan) doped with an acid were immersed in a strong alkaline solution (10 M NaOH solution), and the mixture was agitated at about 150° C. for 72 hours to form titanium oxide nanorods (TNT). As in the fabricating of the titanium oxide nanoparticles in Embodiment II, the titanium oxide nanorods were doped with an acid by agitating the titanium oxide nanorods in an aqueous solution of phosphoric acid aqueous solution more than 6 hours. Thereafter, the mixture was centrifuged and washed repeatedly. Then, the mixture was kept in a vacuum oven more than a day to obtain dried acid doped titanium oxide nanorods. The acid doped titanium oxide nanorods were added to a solution including NAFION and PEG in the amount of 5 parts by weight based on 100 parts by weight of the total weight of NAFION and PEG. The same procedures as those in Embodiment III were further performed to form an electrolyte membrane.

Comparison Example I 0.1 g of benzimidazole was dropwise added to 10 g of 5 wt % of NAFION solution, and the mixture was agitated for 1 hour. Thereafter, the mixture was poured into a Petri dish or a polytetrafluoroethylene (PTFE) vessel and then was dried at about 60° C. for a day. In this way, a uniform electrolyte membrane was fabricated.

Comparison Example II 0.1 g of triazole was dropwise added to 10 g of 5 wt % of NAFION solution, and the mixture was agitated for 1 hour. Thereafter, the mixture was poured into a Petri dish or a polytetrafluoroethylene (PTFE) vessel and then was dried at about 60° C. for a day. In this way, a uniform electrolyte membrane was fabricated.

The proton conductivities of electrolyte membranes fabricated according to Embodiment I were measured at 100° C., and the measured results are shown in Table 2.

TABLE 2

| Nafio:PEG molar ratio | Proton conductivity (S/cm) @ 100° C. |
|---|---|
| 3:1 | $8.445 \times 10^{-4}$ |
| 1:1 | $6.875 \times 10^{-4}$ |
| 1:3 | $6.132 \times 10^{-4}$ |
| 1:6 | $8.545 \times 10^{-4}$ |
| 1:8 | $1.391 \times 10^{-3}$ |
| 1:10 | $1.179 \times 10^{-3}$ |

Figure 2:
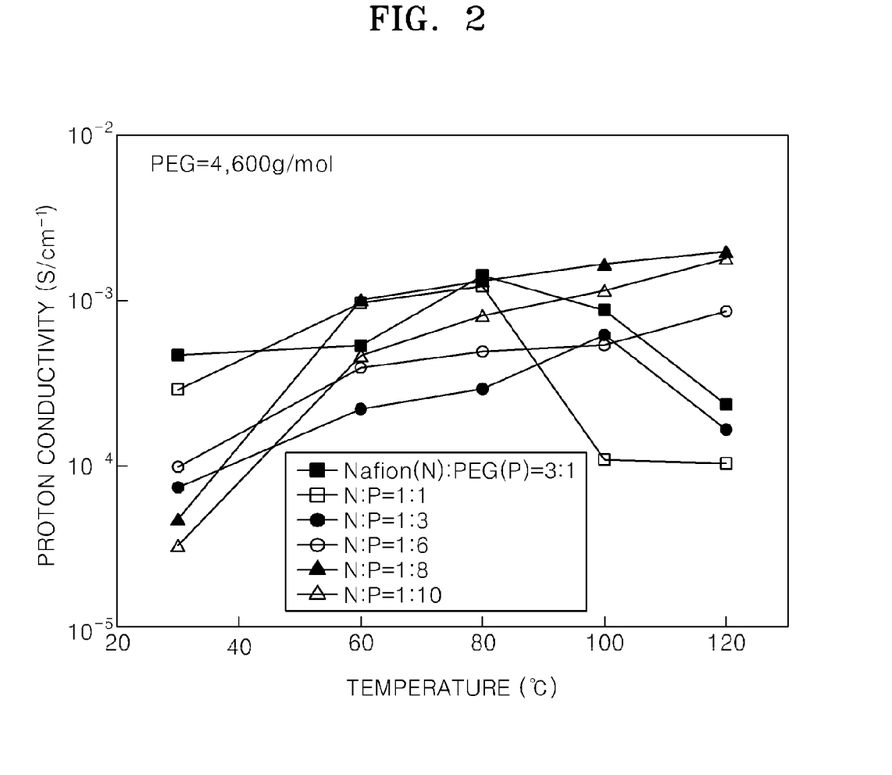
FIG. 2 is a graph illustrating proton conductivities of electrolyte membranes with varying ratios of NAFION and PEG, fabricated according to Embodiment I.

The proton conductivities of electrolyte membranes fabricated according to Embodiment I were measured at 30, 60, 80, 100, and 120° C., and the results are shown in FIG. 2. The proton conductivities of an electrolyte membrane fabricated according to Embodiment I, wherein the molar ratio of NAFION:PEG was 1:8, the electrolyte membrane fabricated according to Comparison Example I and the electrolyte membrane fabricated according to Comparison Example II were measured at 30, 60, 80, 100, and 120° C., and the results are shown in Table 3.

TABLE 3

| | Proton conductivity (S/cm) | | |
|---|---|---|---|
| Measured temperature (° C.) | Embodiment I | Comparison Example I | Comparison Example II |
| 30 | $4.450 \times 10^{-5}$ | — | $1.203 \times 10^{-6}$ |
| 60 | $9.524 \times 10^{-4}$ | $3.514 \times 10^{-6}$ | $2.594 \times 10^{-5}$ |
| 80 | $1.250 \times 10^{-3}$ | $4.541 \times 10^{-5}$ | $5.322 \times 10^{-4}$ |
| 100 | $1.391 \times 10^{-3}$ | $3.545 \times 10^{-4}$ | $1.010 \times 10^{-3}$ |
| 120 | $1.844 \times 10^{-3}$ | $9.190 \times 10^{-4}$ | $1.501 \times 10^{-3}$ |

As shown in FIG. 2, although segment motions of PEG chains used as a polymer solvent were not smooth at room temperature, the segment motions were smooth at about 60° C. or higher so that proton paths could be formed for high proton conductivity. As shown in Table 3, the electrolyte membrane according to Embodiment I (NAFION:PEG=1:8) showed a much higher proton conductivity than the electrolyte membranes according to Comparison Example I and Comparison Example II.

The proton conductivities of electrolyte membranes fabricated according to Embodiment III were measured, and the results are shown in Table 4.

TABLE 4

| $TiO_2$ ($H^+$) (parts by weight) | Proton conductivity (S/cm) @ 100° C.* |
|---|---|
| 0 | $8.899 \times 10^{-4}$ |
| 1 | $1.100 \times 10^{-3}$ |
| 5 | $1.770 \times 10^{-3}$ |
| 10 | $7.699 \times 10^{-4}$ |
| 20 | $6.802 \times 10^{-4}$ |

In table 4, the molar ratio of NAFION:PEG was 1:8, and the weight average molecular weight [Mw] of PEG was 4,600 g/mol.

Proton conductivities of electrolyte membranes fabricated according to Embodiments II and III were measured, and the results are shown in Table 5.

TABLE 5

| Acid | Proton conductivity (S/cm) @ 100° C.* |
|---|---|
| Acetic acid | $1.258 \times 10^{-3}$ |
| Phosphoric acid | $1.770 \times 10^{-3}$ |
| Sulfuric acid | $1.160 \times 10^{-3}$ |

In Table 5, the molar ratio of NAFION:PEG was 1:8, the weight average molecular weight [Mw] of PEG was 4,600 g/mol, and $TiO_2$ was included in the amount of 5 parts by weight.

Referring to Table 5, the proton conductivity was high when phosphoric acid was used as compared with when acetic acid or sulfuric acid were used.

Figure 3:
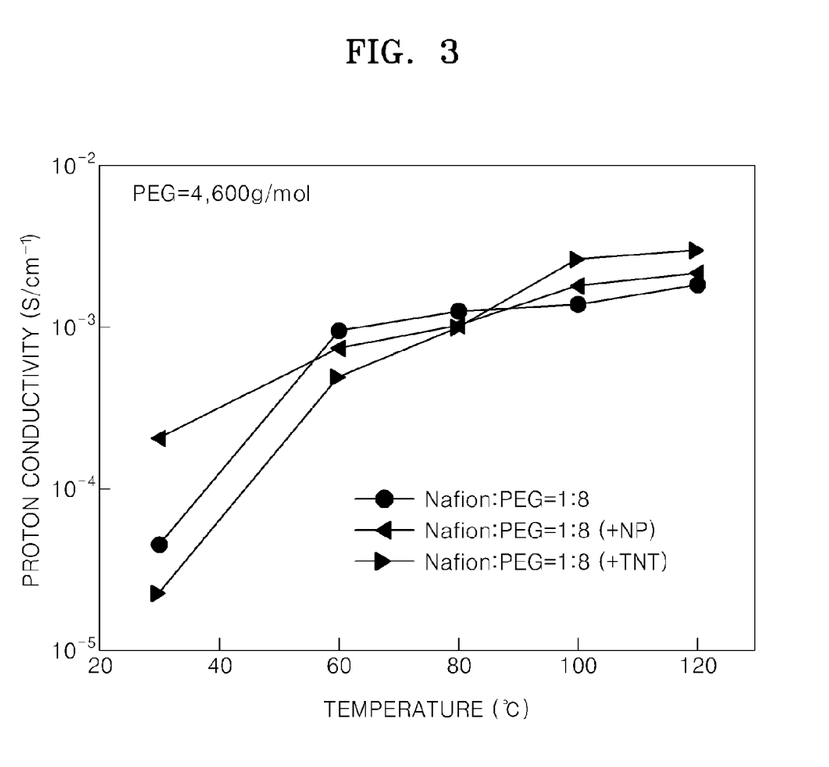
FIG. 3 is a graph illustrating relationships between proton conductivity and temperature of electrolyte membranes fabricated according to Embodiments I, II and IV.

The proton conductivities of electrolyte membranes fabricated using different types of $TiO_2$ according to Embodiments II and IV were measured, and the results are shown in Table 6. FIG. 3 is a graph illustrating relationships between proton conductivity and temperature of electrolyte membranes fabricated according to Embodiments I, II and IV.

TABLE 6

| $TiO_2$ types | Proton conductivity (S/cm) @ 100° C.* |
|---|---|
| Nanoparticle (NT) | $1.770 \times 10^{-3}$ |
| Nanorods (TNT) | $2.261 \times 10^{-3}$ |

In Table 6, the molar ratio of NAFION:PEG was 1:8, the weight average molecular weight [Mw] of PEG was 4,600 g/mol, and $TiO_2$ was included in the amount of 5 parts by weight.

Referring to Table 6 and FIG. 3, the proton conductivity is high when a nano oxide is used as compared with the case where no nano oxide is used.

Figure 4:
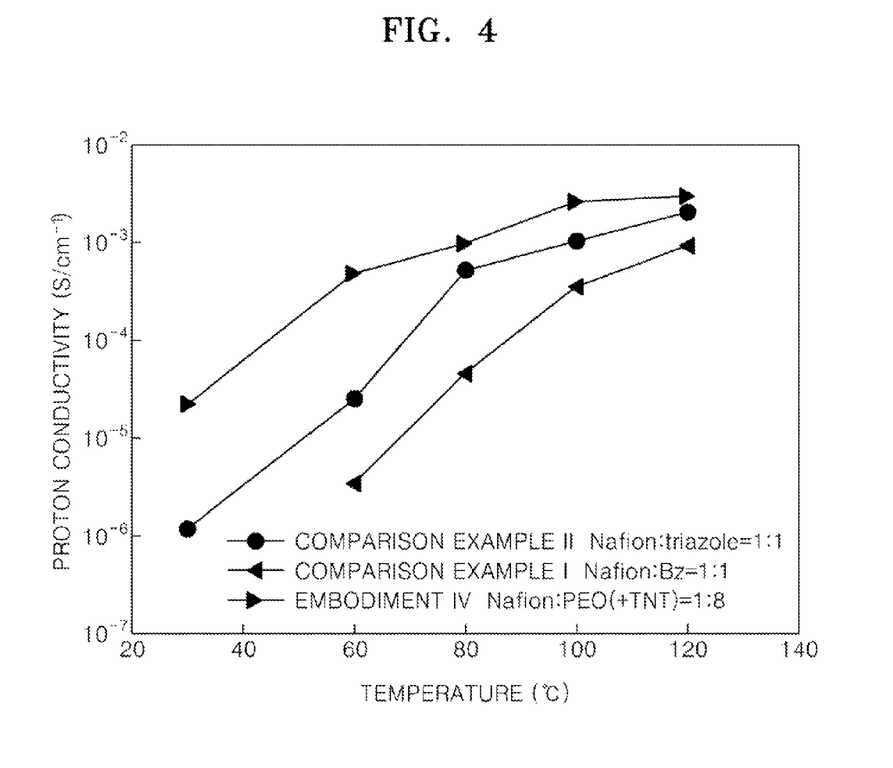
FIG. 4 is a graph illustrating relationships between proton conductivity and temperature of electrolyte membranes fabricated according to Embodiment IV and Comparison Examples I and II.

FIG. 4 is a graph of proton conductivity versus temperature of electrolyte membranes fabricated according to Embodiment IV and Comparison Examples I and II.

Referring to FIG. 4, the proton conductivity of the electrolyte membrane of Embodiment IV is improved as compared with the proton conductivity of electrolyte membranes of Comparisons examples I and II.

Embodiment V

Commercially available electrodes doped with Pt 2.0 mg (E-tek company) were used as a cathode and an anode.

A fuel cell was fabricated by interposing an electrolyte membrane fabricated according to Embodiment IV between the cathode and the anode.

Then, hydrogen was fed to the anode at 100 ccm, and air was fed to the cathode at 200 ccm at 120° C. in a non-humidified condition to generate electricity, and the properties of the fuel cell were measured.

Embodiment VI

The same cathode and anode electrodes as those of Embodiment V were used to form a fuel cell except that a coating layer was additionally formed on the surfaces of the cathode and the anode. The coating layer was formed by applying a solution containing a solid proton conductor to the cathode and the anode and drying the applied solution.

As in Embodiment I, the solution containing the solid proton conductor was prepared by dissolving 1 g of the NAFION and PEG in an acetonitrile/water/ethanol solvent (acetonitrile 9 g/water 1 g/ethanol 3 g), and agitating the solution more than 6 hours. The molar ratio of NAFION:PEG was 1:8.

Comparison Example III

A fuel cell was fabricated in the same way as in Embodiment V except that an electrolyte membrane fabricated according to Comparison Example I was used instead of an electrolyte membrane fabricated according to Embodiment IV.

Figure 5:
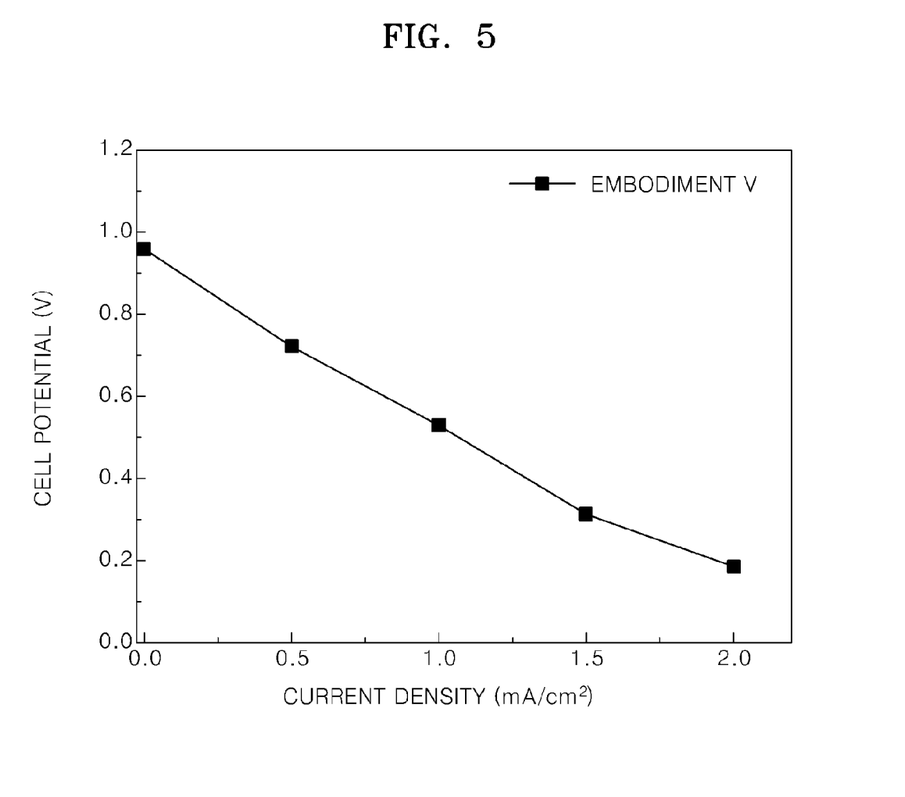
FIG. 5 is a graph illustrating a relationship between cell voltage and current density of a fuel cell fabricated according to Embodiment V.

A relationship between cell voltage and current density of the fuel cell of embodiment V is shown in FIG. 5.

Referring to FIG. 5, the fuel cell of Embodiment V has excellent voltage characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solid proton conductor comprising:
   a polymer providing a proton source;
   a hydrophilic polymer providing a proton path; and
   at least one proton conductive additive selected from the group consisting of acid treated oxide nanoparticles and acid-treated oxide nanorods, wherein the hydrophilic polymer is selected from the group consisting of polyethylene oxide, polyethylene glycol, poly 2-ethyloxazoline, and mixtures thereof, wherein the acid treated oxide nanoparticles and acid-treated oxide nanorods are acid treated with an acid solution selected from the group consisting of a sulfuric acid, a phosphoric acid, acetic acid, and a mixture thereof, the solid proton conductor comprises 1 to 30 parts by weight of the proton conductive additive based on 100 parts by weight of the total weight of the polymer and the hydrophilic polymer.

2. The solid proton conductor of claim 1, wherein the polymer comprises at least one polymer selected from the group consisting of a perfluorinated sulfonic acid group containing polymer, a sulfonated polyether ether ketone, a sulfonated polyimide, a sulfonated polystyrene, a sulfonated polysulfone, and a sulfonated or phosphated hydrocarbon polymer.

3. The solid proton conductor of claim 1, wherein a molar ratio of the polymer and the hydrophilic polymer is in a range of 3:1 to 1:10.

4. The solid proton conductor of claim 1, wherein the acid treated oxide nanoparticles or nanorods are formed of at least one material selected from the group consisting of titania ($TiO_2$), silica ($SiO_2$), and tin oxide ($SnO_2$).

5. The solid proton conductor of claim 1, wherein the solid proton conductor comprises 1 to 5 parts by weight of the proton conductive additive based on 100 parts by weight of the total weight of the polymer and the hydrophilic polymer.

6. An electrolyte membrane of a fuel cell, comprising a solid proton conductor that comprises a polymer providing a proton source, a hydrophilic polymer providing a proton path, and at least one proton conductive additive selected from the group consisting of acid treated oxide nanoparticles and acid-treated oxide nanorods, wherein the hydrophilic polymer is selected from the group consisting of polyethylene oxide, polyethylene glycol, poly 2-ethyloxazoline, and mixtures thereof, wherein the acid treated oxide nanoparticles and acid-treated oxide nanorods are acid treated with an acid solution selected from the group consisting of a sulfuric acid, a phosphoric acid, acetic acid, and a mixture thereof, the solid proton conductor comprises 1 to 30 parts by weight of the proton conductive additive based on 100 parts by weight of the total weight of the polymer and the hydrophilic polymer.

7. The electrolyte membrane of claim 6, wherein the electrolyte membrane is in a non-humidified condition.

8. The electrolyte membrane of claim 6, wherein the polymer comprises at least one polymer selected from the group consisting of a perfluorinated sulfonic acid group containing polymer, a sulfonated polyether ether ketone, a sulfonated polyimide, a sulfonated polystyrene, a sulfonated polysulfone, and a sulfonated or phosphated hydrocarbon polymer.

9. The electrolyte membrane of claim 6, wherein a molar ratio of the polymer to the hydrophilic polymer is in a range of 3:1 to 1:10.

10. The electrolyte membrane of claim 6, wherein the oxide nanoparticles or nanorods are formed of at least one of titania ($TiO_2$), silica ($SiO_2$), and tin oxide ($SnO_2$).

11. The electrolyte membrane of claim 6, wherein the solid proton conductor comprises 1 to 5 parts by weight of the proton conductive additive based on 100 parts by weight of the total weight of the polymer and the hydrophilic polymer.

12. A fuel cell comprising a cathode, an anode, and an electrolyte membrane disposed between the anode and cathode and comprising a solid proton conductor that comprises a polymer providing a proton source and a hydrophilic polymer providing a proton path, and at least one the proton conductive additive selected from the group consisting of acid treated oxide nanoparticles and acid-treated oxide nanorods, wherein the hydrophilic polymer is selected from the group consisting of polyethylene oxide, polyethylene glycol, poly 2-ethyloxazoline, and mixtures thereof, wherein the acid treated oxide nanoparticles and acid-treated oxide nanorods are acid treated with an acid solution selected from the group consisting of a sulfuric acid, a phosphoric acid, acetic acid, and a mixture thereof, the solid proton conductor comprises 1 to 30 parts by weight of the proton conductive additive based on 100 parts by weight of the total weight of the polymer and the hydrophilic polymer.

13. The fuel cell of claim 12, wherein the at least one of the cathode and the anode comprises the polymer providing a proton source, the hydrophilic polymer providing a proton path, and at least one the proton conductive additive selected from the group consisting of acid-treated oxide nanoparticles and acid-treated oxide nanorods.

14. The fuel cell of claim 12, wherein a molar ratio of the polymer and the hydrophilic polymer is in a range of 3:1 to 1:10.

15. The fuel cell of claim 12, wherein the electrolyte membrane is in a non-humidified condition.

16. The fuel cell of claim 12, wherein the solid proton conductor comprises 1 to 5 parts by weight of the proton conductive additive based on 100 parts by weight of the total weight of the polymer and the hydrophilic polymer.

* * * * *